United States Patent [19]

Heidergren

[11] 4,072,986
[45] Feb. 7, 1978

[54] MESSAGE SYNTHETIZER
[75] Inventor: Lars Heidergren, Lidingo, Sweden
[73] Assignee: AB Gylling & Co., Bromma, Sweden
[21] Appl. No.: 601,199
[22] Filed: Aug. 1, 1975
[30] Foreign Application Priority Data
  Aug. 9, 1974    Sweden ................................ 7410212
[51] Int. Cl.² .............................................. G11B 5/00
[52] U.S. Cl. .......................................... 360/12; 360/6;
                                                        179/100.1 C
[58] Field of Search ............... 360/6, 12; 179/100.1 C,
                                                        179/6 TA, 6 C

[56]          References Cited
          U.S. PATENT DOCUMENTS

| 3,333,247 | 7/1967 | Hadley | 360/6 X |
| 3,339,175 | 8/1967 | Forester | 360/6 X |
| 3,412,215 | 11/1968 | Rawley | 360/12 |
| 3,460,065 | 8/1969 | Forester | 360/6 X |

| 3,564,523 | 2/1971 | Cavelos | 360/6 |

FOREIGN PATENT DOCUMENTS

| 1,345,581 | 1/1974 | United Kingdom | 360/6 |

Primary Examiner—Harold I. Pitts
Attorney, Agent, or Firm—Strauch, Nolan, Neale, Nies & Kurz

[57]          ABSTRACT

A device for synthetizing a message in response to an interrogation signal, the message consisting of a number of separate digits, terms, etc. indicating the value and possibly other features of a quantity. The device has a recorder with a number of endless tracks with individual recordings of digits, terms, etc., which can be used to constitute the desired message, and read-out devices, with a program device and logic circuits for controlling the delivery of the message and to repeat that same message a predetermined number of times.

4 Claims, 3 Drawing Figures

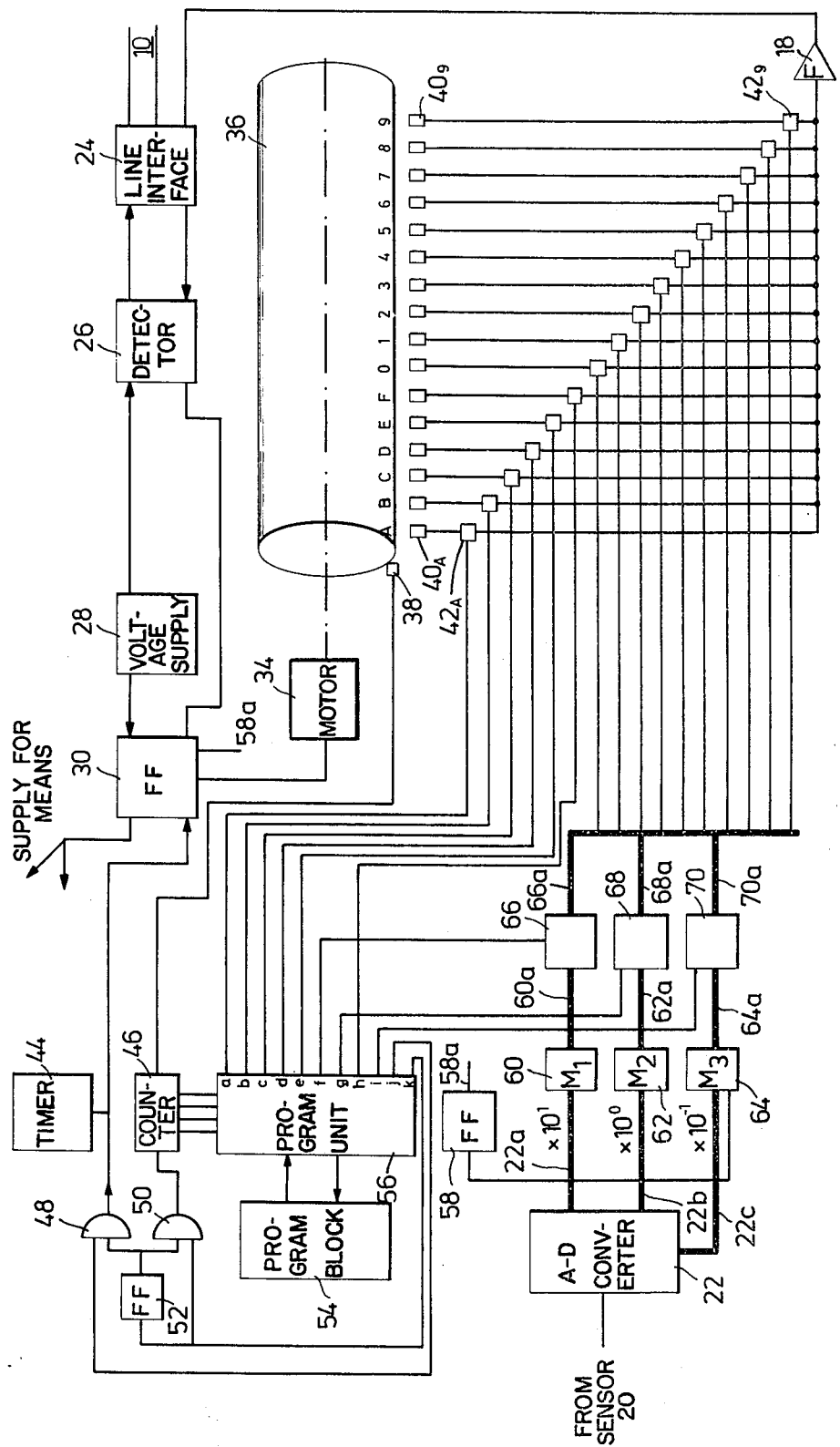

MESSAGE SYNTHESIZER

BACKGROUND OF THE INVENTION

The present invention concerns a message synthetizer, that is a device which after having been triggered by an action delivers a message obtained by playing back a number of recordings put together by a program device from a stock of such recordings.

Already there is known a time announcement device in telephone exchanges having recordings corresponding to the time in question among recordings corresponding to all during a 24 hours day present hour announcements, all during an hour present minute announcements, and announcements corresponding to every 10 seconds during a minute. These recorded announcements are played back to such an extent that corresponds to an hour announcement, a minute announcement and a 10 second announcement.

In this previously known case it is the question of an announcement with rigorous conformity as there is always an hour announcement, in genuine sequence, a minute announcement in genuine sequence and a second announcement in genuine decade second announcement.

The present invention concerns a message synthetizer of such a kind that with a number of recordings as a starting point said synthetizer forms a message by using a from, case to case, varying number of said recordings in a sequence chosen for each separate case.

Now it oftens occurs that devices—sentinels—monitor a condition, a process or the like in respect to one or several functions and when a limit for a parameter in question is passed gives an alarm or indicating signal to a central supervision place from which action is taken to take care of said passing of the limit.

In, for example, a boiler plant an indicating signal may be emitted when the water level goes down under or goes up over a given limit. From the central supervision place personnel may be sent out to investigate the reason why the automatically maintained water level has passed a predetermined limit. In many cases the limits given for the automatic maintenance of the water level are so narrow that an action is needed only within a relatively long time if the water level after said passing of the limit has a value which only little differs from the limit value. In another case it may be the question of a serious fault and such a rapid change of the water level after the passing of the limit that it is necessary to make a fire-brigade (rapid) departure.

Thus it is a desire to obtain from a supervision center of the described type—and possibly also from other places—a message stating the, for the moment, actual parameter value and for instance get this parameter value via the public telephone system which could be in response to a call to a given telephone number. Hereby the device is put into operation and from the already present recordings those are chosen which correspond to the digital value of the sensed actual parameter and are played back from the recording—together with, for example, common identification information—so that the delivered message gives sufficient information to the supervision center—or a corresponding calling party—for a judgment of the situation and taking the necesary steps. In the earlier example with a boiler plant where there might be given an indication that a water level limit has been passed the following message may be had: "Boiler one water level one point three six meter".

It is evdient that the message contains a number of part-messages (message words or phrases) which exist as previously stored recordings.

For selecting and combining desired parts of those previously stored recordings that are to be included in a delivered message there is provided a programming means and this programming means will get control pulses from the monitored device which has a number of sensing units. These sensing units are influenced by the parameter value given as a digital value. Devices for digitally giving a sensed parameter value are now well known and do not form part of the invention but are means of assistance. Thus it has been considered that in order to explain the present invention there is no need for a detailed account of these devices.

BRIEF DSCRIPTION OF THE DRAWINGS

In order that the invention may be fully understood an embodiment of the invention will be described as an example with reference to the accompanying drawings, of which:

FIG. 2 is a more detailed diagram of the device shown in FIG. 1; and

Figure 3:
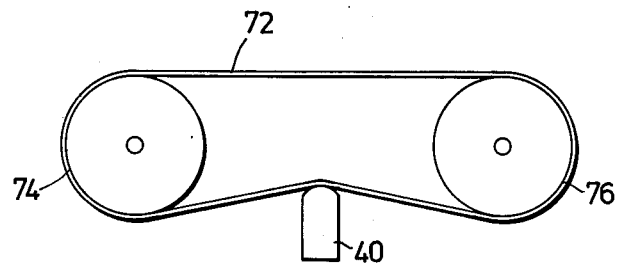

FIG. 3 schematically shows an alternate device for pre-recorded information storage using magnetic heads and a magnetic tape in lieu of the storage drum of FIG. 2.

Figure 1:
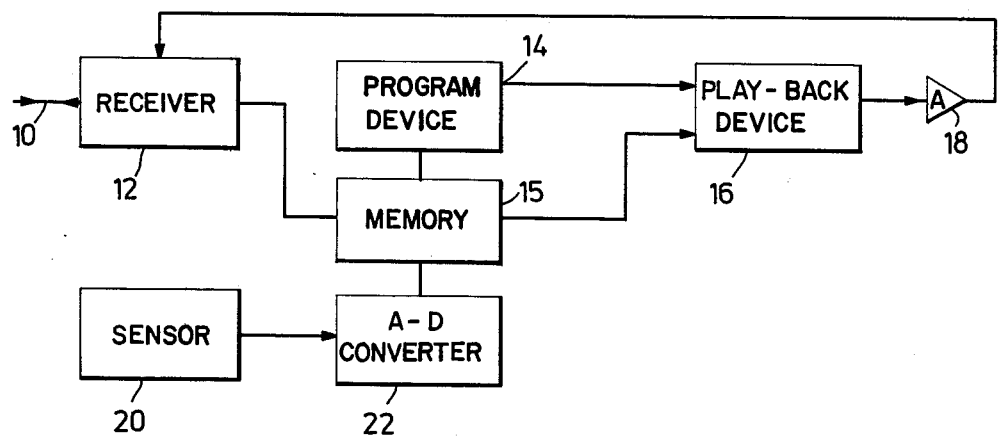
FIG. 1 is a block diagram of the device.

In the message synthetizer shown by the block diagram in FIG. 1 there is an interrogation line 10 which, for example, may be a line connected to the public telephone system. This line 10 is connected to the receiving device 12 that has means for detecting an incoming interrogation, and in a simple case—when it is a question of only the condition of a device—only the ringing signal is to be detected. If the case is to interrogate about a number of devices and separate parameters for each of these devices it may be the question of detecting as well the ringing signal as also further interrogation signals constituted by from the calling telephone coming signals of appropriate type.

The receiving device 12 has the task of, after having received the ringing signal and possible further interrogation signals, holding the calling telephone connected to said receiving device which according to the single or composite interrogation signal is activated by a monostable flip-flop (not shown) in memory units in a memory 15. From the sensing unit 20 signals representing a sensed condition are received and converted from analog to digital form in the A-D-converter 22 and, upon receipt of the interrogation signals, the sensed signal information present in the A-D-converter 22 are read into and stored in the memory units. In the memory 15 there are also slave units. A program device 14 determines the read-out of memory 15.

With the original from the receiver 12 obtained interrogation signals and the digital signals from the A-D-converter 22 as a basis, and with said digital signals having been rendered more complete by a possibly needed decimal point signal in either the A-D-converter 22 or the program device 14, the program device 14 generates a group or set of command signals. These command signals are sent to the play-back device 16. This device contains a number of play-back tracks corresponding to the intended conditions, and with regard to the desire to have a synthetized message with digital information according to the decimal number system at least 10 tracks or track sections are needed for playback of the digits zero to nine. In many cases there will also be tracks or track sections for stating a parameter among a number of such parameters and in this case it may be the question of the name of parameters of different kinds and/or the sequence number for a given parameter. In some cases it may be reason to state the sort of parameter, for example, degrees Celcis. A simple way to accomplish this is to provide an endless track with associated playback head for each message section in the synthetized message to be delivered. Here is pointed out that in general it is the question of tracks with magnetic or optical recording. The tracks corresponding to the command signals are connected in the intended time sequence and the intended message sections are played back are, via an amplifier 18, sent to the receiver 12 and further via the line 10 to the interrogating telephone.

Preferably the play-back device has means emitting a termination signal when the message sections have been delivered one or possibly a predetermined number of times. This termination signal is also sent to the receiver 12 and causes the interrogating telephone to be disconnected. The receiver 12 is then ready to receive a new interrogation.

For a man versed in the art it is evident that within the now given design compass it is with regard to the present state of art possible to have many solutions of the here stated problems.

In order to show how in practice a device according to the already described fundamental structure may be realized, attention is directed to FIG. 2 where the details are given more specifically.

The interrogation line (the telephone line) has also in FIG. 2 been given the reference 10 and is connected to a line interface unit 24, and to the unit 24 is also connected the amplifier 18 which cooperates with the play-back means in order to bring the combined message to the interrogating telephone via the line 10.

To the line interface unit 24 is connected a detector 26 and is intended to detect the ringing signal coming via the line 10. This detector as well as other included means are supplied from a voltage supply 28 and this is done via a flip-flop 30 which when receiving a signal provides the desired supply.

Among the means thereby being supplied is the means 36 which is an information carrier shown as a magentic drum but may be in the form of a magnetic tape transported over appropriate rollers. The magnetic drum is driven by a motor 34 and the rotation of the magnetic drum is supervised by a revolution sensor 38 connected to a counter 46 as stated in more detail further on.

The drum 36 has a plurality of tracks, each of which has a magnetic head associated therewith. The heads are referenced corresponding to their associated track A, B, C, D. E, F. 0, 1, 2, 3, 4, 5, 6, 7, 8, 9 in order to be distinguished. These magnetic head $40_4 \ldots 40_9$ emit, when the drum rotates, the message sections recorded in the tracks A...9 respectively and the thus received audio signals can, via the amplifier 18, be sent to the line 10 as already stated. In order to provide a message it is evident that signals from only one track at a time are allowed to go to the input of amplifier 18. In order to control transfer of selected track information to the amplifier each magnetic head $40_4 \ldots 40_9$ can be individually connected to the amplifier 18 via an associated controlled switch $42_4 \ldots 42_9$. The control of individual switches $42_A$ through $42_9$ takes place by signals from means described further on.

From the sensor 20 in (seen in FIG. 1) analog signals go to the A-D-converter 22 (also seen in FIG. 1 as the converter 22) and the converter delivers signals in form of BCD-signals (binary coded decimal) on groups of lines marked 22a, 22b; and 22c, and in the present case the group of lines 22a has signals constituting tens— stated by the designation "$x10^1$". In the same way the group of lines 22b has unit signals, stated by the designation "$x^0$", and the group of lines 22c has tenth signals stated by the designation "$x10^1$". It is evident that the A-D-converter 22 and the associated groups of lines are arranged in such a way that each digit value in each separate case is given in the correct digit position.

The groups of lines 22a, 22b and 22c go to the memory flip-flops of master-slave type and these have been designated as 60,62 and 64 and also as $M_1$, $M_2$ and $M_3$ in order to state their nature. They are provided in a given number in each of the shown rectangles 60,62 and 64. By means of groups of lines 60a, 62a and 64a they are connected to converters 66, 68 and 70 and in the last-named there is taking place a conversion from BCD-signals to decimal signals which within each of the used decades states the appropriate decimal digit 0 . . . 9 on those groups of lines that are designated 66a, 68a and 70a respectively. From the last-named groups of lines 66a, 68a and 70a each separate decimal digit is conveyd to the appropriate of said controlled switches $42_0 \ldots 42_9$ for connection of the corresponding magnetic head $40_0 \ldots 40_9$.

The said control flip-flops 60, 62 and 64 receive control or clock signals from a monostable flip-flop 58 and this flip-flop is triggered by the flip-flop 30 via the line 58a.

Besides the said means there is also a programming block 54 and a program unit 56 in two-way connection with each other. The program unit 56 is further connected to a counter 46 which receives counting pulses from the already stated revolution sensor 38 and therefore counts the number of revolutions the drum 36 rotates. The program unit 56 is via lines from its output k connected to a repeat flip-flop 52 supplying AND-gates 48 and 50. The gate 48 supplies, alternating with a time unit 44, the flip-flop 30. The gate 50 supplies the counter 46 in order to get a repetition as will be stated further on. The program unit has an additional number of outputs (besides j and k) and these are marked a,b,c,-d,e,f,g,h and i. The outputs a,b,c,d,e, are connected to the corresponding controlled switches $42_A$, $42_B$, $42_C$, $42_D$ and $42_E$. The output f is connected to the converter 66, the output g is connected to the converter 68 and the output i is connected to the converter 70. The output h is connected to the controlled switch $42_F$.

The device according to FIG. 2 may in a typical case have the following operation:

(1) A ringing signal coming to the detector 26 via the line interface unit 24 (said signal coming from as example the public telephone system) is detected in said detector 26 and the detector 26 sends back a signal to the line interface unit 24 and a line relay is activated in said interface unit.

(2) The flip-flop 30 is set and this provides voltage supply to as well the motor 34 as other units and means that need voltage supply.

(3) The motor 34 has got voltage feed and rotates and will for each revolution influence the revolution sensor 38 which then sends a pulse to the counter 46. The counter 46 thereby begins to control the program unit 56 and the program unit steps forward to the first position-position a, which is connected to and actuates the first controlled switch $42_A$ to connect the first magnetic head $40_A$ to the amplifier 18 and thence to the line 10.

(4) After each full revolution of the drum 36 the program unit 56 is stepped forward one step. Hereby the positions a,b,c and d may for example be used for causing read-out of pre-recorded address information from drum tracks A, B, C and D and similarly using the position e for causing read-out of the unit of measure from drum track E for the coming digital value.

(5) When the flip-flop 30 is set the monostable flip-flop 58 is influenced via the line 58a and said flip-flop 58 then delivers a read pulse to the memory flip-flops $M_1$, $M_2$ and $M_3$ which work as memories. Hereby the signals from the A-D-converter 22 goes in BCD-form to said memory flip-flops $M_1$, $M_2$ and $M_3$.

(6) When the program unit has come to the position f a read command is given to the converter or decoder 66 which is active for the tens. Hereby the one among the controlled switches $42_0 \ldots 42_9$ which corresponds to the readout digit will connect the corresponding magnetic head among the magnetic heads marked $40_0 \ldots 40_9$ to the amplifier 18 and further to the line 10.

(7) With the program unit 56 in position g the process stated in (6) is repeated and in this case it is the converter or decoder 68 for units that will get a read command and then influences that controlled switch among the controlled switches $42_0 \ldots 42_9$ corresponding to the decoded digit.

(8) When the program unit 56 is position h the controlled switch $42_F$ associated with the magnetic head $40_F$ is connected for play back of the track F which, in the described example, contains the pre-recorded message "decimal point".

(9) With the program unit in positon i the process stated in (6) and (7) is repeated but in this case the converter or decoder 70 for tenths (first decimal) receives a read command and influences that controlled switch among the controlled switches $42_0 \ldots 42_9$ which corresponds to the decoded digit.

(10) With the program unit 56 stepped to position j the gate 48 receives a signal on one input as the flip-flop 52 is not yet set nothing happens. When the drum has rotated a further revolution (and this is done "silently" , that is without any audible signal being delivered, in order to mark an interval before the repeating of the message) a further stepping to position k takes place. Hereby the flip-flop 52 is set and now there will be signals on both inputs to the gate 50, which provides an input to counter 46 and now the program unit 56 will be stepped to the position a and the whole message is repeated. During this repeat sequence, when then the position j is attained the gate 48 will receive logic "1" on both inputs (the flip-flop 52 is set) and a release of flip-flop 30 takes place.

When said release takes place the holding of the line 10 ceases and the device is ready for a new interrogation.

It is evident that the program unit may be arranged in such a way that the message is given only one time or a predetermined number of times (two times in the example dealt with).

The play-back device has been shown as a drum 36 with associated magnetic heads 40 but it is evident, as already said, that instead of a magnetic record the tracks A . . . 9 could consitute an optical record and the head 40 be optical heads.

It is not necessary to use a drum of the type shown and FIG. 3 shows a modification near at hand. Here a magnetic tape travels over two rollers 74 and 76 and passes respective magnetic heads 40. By the shown arrangement the contact between the tape 72 and the magnetic head 40 will take place throughout a substantial length and the adjustment will be much simpler than at the drum 36 shown in FIG. 2 where the heads 40 are arranged at the outside of the drum.

Also in other respects the invention is not limited to what has been described and shown on the drawings but comprises all changes and modifications falling within the scope of the attached claims.

Thus other types of recordings than magnetic and optical may be used and it may for example be used a mechanical recording of similar type as the one used for phonograph records or engraving by means of a laser beam. Alternatively the recording may be done in digital form and read-out take place via a digital-analog-converter.

What I claim is:

1. Message synthetizer device for providing a message consisting of a number of separate digits, terms etc. indicating aspects and features of a sensed quantity condition in response to an interrogation signal, said device comprising: an interrogation detecting device connected to a communication circuit; a sensor means for sensing the value of said condition; an A-D-converter connected to said sensor means having an output for delivering the digital value of said sensed quantity; recorder means with a plurality of endless tracks with recordings of information including said digits, terms etc.; a plurality of read-out devices, one for each of said tracks; an output circuit individually connected from each read-out and each including a controlled switch device connected to a common signal line adapted to be connected to said communication circuit; means for continuously moving said endless tracks past said read-out devices; controlled memory devices connected to receive and, upon detection of an interrogation signal, to store said digital value from the A-D-converter and having controlled output circuits responsive to programmed signal sequence connected to selected ones of said controlled switch device for predeterming the path of control signals to selected controlled switch devices for connection of appropriate digit track read-out devices, one at a time, for read-out and transmission of the corresponding track recordings to said common signal line; a program device having output control connections to the controlled counter output circuits and selected ones of said controlled switch devices for controlling delivery of recorded track information in a predetermined sequence to said common output signal line; means connected to and initiated by said interrogation device for energizing the components of said synthetizer device providing a store command signal to said memory devices and starting said program device; and logic circuit means, connected to and controlled by said program device and having output control connections to said program devices and to said means for energizing said synthetizer components, for enabling at least one repeat transmission of the same synthetized message by said program device and then terminating transmission.

2. Message synthetizer device according to claim 1, wherein said logic circuit means comprises a repeat flip-flop to be set and to initiate repeat cycling of said program device after an initial transmission of the message.

3. Message synthetizer device according to claim 2, including means sensing each repeated complete cycle of movement of said recorder device connected to said program device to cause sequence stepping of said program device to provide step-by-step sequential control signals on said program device output control connections, at least one of said output control connections being connected to said logic circuit means to enable said logic circuit means to initiate repeat cycling of said program device.

4. Message synthetizer device according to claim 1, including means sensing each repeated complete cycle of movement of said recorder device connected to said program device to cause sequence stepping of said program device to provide step-by-step sequential control signals on said program device output control connections.

* * * * *

UNITED STATES PATENT OFFICE
CERTIFICATE OF CORRECTION

Patent No. 4,072,986           Dated February 7, 1978

Inventor(s) Lars Heidergren

It is certified that error appears in the above-identified patent and that said Letters Patent are hereby corrected as shown below:

Column 3, line 17, change "are" to --and--.

Column 3, line 58, delete the "period" after D and insert a --comma--; delete the "period" after F and insert a --comma--.

Column 4, line 4, after "20" delete --in--.

Column 4, line 12, change "$x^0$" to --"$x10^0$"--.

Column 4, line 13, change "$x10^1$" to --"$x10^{-1}$"--.

Signed and Sealed this

Twenty-third Day of May 1978

[SEAL]

Attest:

RUTH C. MASON  
Attesting Officer

LUTRELLE F. PARKER  
Acting Commissioner of Patents and Trademarks